United States Patent
Lassen et al.

(10) Patent No.: US 9,741,089 B2
(45) Date of Patent: *Aug. 22, 2017

(54) GRAPHICS PROCESSING SYSTEMS

(71) Applicant: ARM Limited, Cambridge (GB)

(72) Inventors: Anders Lassen, Trondheim (NO); Jorn Nystad, Trondheim (NO); Alexis Mather, Cambridge (GB); Sean Tristram Ellis, Farnham (GB)

(73) Assignee: ARM LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,969

(22) Filed: May 2, 2014

(65) Prior Publication Data

US 2014/0368521 A1  Dec. 18, 2014

Related U.S. Application Data

(63) Continuation-in-part of application No. 13/875,810, filed on May 2, 2013, now Pat. No. 9,607,356.

(51) Int. Cl.
*G09G 5/39* (2006.01)
*G06T 15/00* (2011.01)
(Continued)

(52) U.S. Cl.
CPC .......... *G06T 1/60* (2013.01); *G06T 1/20* (2013.01); *G06T 11/001* (2013.01); *G06T 11/40* (2013.01);
(Continued)

(58) Field of Classification Search
CPC .. G09G 5/39; G09G 2360/122; G06T 11/001; G06T 15/005
(Continued)

(56) References Cited

U.S. PATENT DOCUMENTS 5,905,506 A  5/1999  Hamburg
6,044,178 A  3/2000  Lin
(Continued)

FOREIGN PATENT DOCUMENTS

EP   0829820 A2   3/1998
GB   2353686      2/2001
JP   9-212678     8/1997

OTHER PUBLICATIONS

Combined Search and Examination Report dated Nov. 4, 2014 in GB Patent Application No. GB1407757.2, 5 pages.
(Continued)

*Primary Examiner* — Joni Richer
(74) *Attorney, Agent, or Firm* — Vierra Magen Marcus LLP

(57) ABSTRACT

A tile-based graphics processing pipeline comprising a rasteriser 3, a renderer 6, a tile buffer 10 configured to store rendered fragment data locally to the graphics processing pipeline prior to that data being written out to an external memory, a write out stage 13 configured to write data stored in the tile buffer to an external memory, and a programmable processing stage 14. The programmable processing stage 14 is operable under the control of graphics program instructions to read fragment data stored in the tile buffer 10 on a random access basis, perform a processing operation using the read fragment data, and write the result of the processing operation into the tile buffer 10 or to an external memory.

20 Claims, 2 Drawing Sheets

(51) Int. Cl.
| | |
|---|---|
| *G06T 11/00* | (2006.01) |
| *G06T 1/60* | (2006.01) |
| *G06T 1/20* | (2006.01) |
| *G06T 11/40* | (2006.01) |

(52) U.S. Cl.
CPC .............. *G06T 15/005* (2013.01); *G09G 5/39* (2013.01); *G09G 2360/122* (2013.01)

(58) Field of Classification Search
USPC ........ 345/501, 502, 506, 530, 536, 537, 544
See application file for complete search history.

(56) References Cited

U.S. PATENT DOCUMENTS

| | | | |
|---|---|---|---|
| 6,380,935 | B1 | 4/2002 | Heeschen et al. |
| 6,466,223 | B1* | 10/2002 | Dorbie et al. ................. 345/582 |
| 6,614,448 | B1 | 9/2003 | Garlick et al. |
| 6,674,443 | B1* | 1/2004 | Chowdhuri et al. .......... 345/557 |
| 6,798,421 | B2* | 9/2004 | Baldwin ...................... 345/557 |
| 6,856,320 | B1 | 2/2005 | Rubinstein et al. |
| 6,914,609 | B2 | 7/2005 | Tang et al. |
| 6,943,809 | B2 | 9/2005 | Dermer |
| 7,053,893 | B1* | 5/2006 | Molnar et al. ................. 345/426 |
| 7,102,646 | B1 | 9/2006 | Rubinstein et al. |
| 7,170,515 | B1 | 1/2007 | Zhu |
| 7,920,139 | B2* | 4/2011 | Nystad et al. ................. 345/419 |
| 8,059,144 | B2 | 11/2011 | Faye-Lund et al. |
| 8,106,921 | B2* | 1/2012 | Nystad et al. ................. 345/614 |
| 8,212,832 | B2 | 7/2012 | Stefanidis et al. |
| 8,325,203 | B1 | 12/2012 | Donham |
| 9,070,200 | B2 | 6/2015 | Engh-Halstvedt |
| 2002/0126138 | A1 | 9/2002 | Shekter |
| 2003/0169265 | A1 | 9/2003 | Emberling |
| 2004/0012599 | A1 | 1/2004 | Laws |
| 2006/0018558 | A1 | 1/2006 | Kuniba |
| 2006/0033743 | A1 | 2/2006 | Morein |
| 2006/0126736 | A1 | 6/2006 | Shen |
| 2008/0008402 | A1 | 1/2008 | Chang |
| 2008/0273032 | A1* | 11/2008 | Brennan .................. G06T 1/60 345/421 |
| 2008/0303841 | A1 | 12/2008 | Newhall |
| 2011/0074765 | A1 | 3/2011 | Oterhals et al. |
| 2011/0080419 | A1* | 4/2011 | Croxford et al. ............. 345/531 |
| 2011/0148919 | A1 | 6/2011 | Heggelund |
| 2012/0280973 | A1 | 11/2012 | Nagy |
| 2013/0155103 | A1 | 6/2013 | Kakarlapudi et al. |
| 2013/0293544 | A1* | 11/2013 | Schreyer et al. ............. 345/426 |
| 2014/0184623 | A1 | 7/2014 | Frascati et al. |
| 2014/0192075 | A1* | 7/2014 | Stamoulis .............. G09G 5/393 345/549 |

OTHER PUBLICATIONS

Search Report dated Feb. 17, 2015 in GB Patent Application No. GB1415243.3, 3 pages.
Response to Office Action filed Mar. 19, 2015 in U.S. Appl. No. 13/875,810, 16 pages.
Response to Office Action filed Feb. 20, 2015 in U.S. Appl. No. 13/875,831, 11 pages.
Combined Search and Examination Report dated Nov. 4, 2014 in Great Britain Patent Application No. GB1407752.3, 5 pages.
Combined Search and Examination Report dated Nov. 4, 2014 in GB Patent Application No. GB1407756.4, 5 pages.
Office Action dated Nov. 19, 2014 in U.S. Appl. No. 13/875,810, 26 pages.
Office Action dated Nov. 20, 2014 in U.S. Appl. No. 13/875,831, 37 pages.
Amendment dated Apr. 4, 2016, in U.S. Appl. No. 13/870,810, filed May 2, 2013.
Final Office Action dated Jun. 19, 2015 in U.S. Appl. No. 13/875,810, 53 pages.
Response to Office Action filed Oct. 19, 2015 in U.S. Appl. No. 13/875,810, 17 pages.
Office Action dated Dec. 2, 2015 in U.S. Appl. No. 13/875,810, 32 pages.
Office Action dated Jul. 7, 2015 in U.S. Appl. No. 13/875,822, 66 pages.
Response to Office Action filed Oct. 7, 2015 in U.S. Appl. No. 13/875,822, 11 pages.
Office Action dated Oct. 21, 2015 in U.S. Appl. No. 14/015,897, 96 pages.
Notice of Allowance dated Mar. 27, 205, in U.S. Appl. No. 13/875,831, filed May 2, 2013.
Office Action dated Dec. 10, 2015, in U.S. Appl. No. 13/875,822, filed May 2, 2013.
Amendment dated Apr. 11, 2016, in U.S. Appl. No. 13/875,822, filed May 2, 2013.
Office Action dated Apr. 27, 2016, in U.S. Appl. No. 13/875,822, filed May 2, 2013.
Amendment dated Apr. 19, 2016, in U.S. Appl. No. 14/015,897, filed Aug. 30, 2013.
Final Office Action dated Jul. 6, 2016, in U.S. Appl. No. 13/875,810, filed May 2, 2013.
Notice of Allowance dated Aug. 3, 2016, in U.S. Appl. No. 14/015,897, filed Aug. 30, 2013.
Ellis, et al., U.S. Appl. No. 14/015,897, filed Aug. 30, 2013, titled "Graphics Processing Systems."
J.D. Foley et al., "Computer Graphic Principles and Practice," Second Edition in C, 1997, pp. 886-891.
F.I. Parke, "Simulation and Expected Performance Analysis of Multiple Processor Z-Buffer Systems," ACM 1980, pp. 48-56, Jul. 14, 1980.
Search Report for GB0906691.1, dated Aug. 13, 2009. 1 page.
Deferred shading, Wikipedia, Aug. 26, 2013, available at: http://en.wikipedia.org/wiki/Deferred_shading, 6 pages.
Search Report for GB1121886.4, dated Apr. 20, 2012, 1 page.
Mark et al., "The F-Buffer: A Rasterization-Order FIFO Buffer for Multi-Pass Rendering," SIGGRAPH, 2001, pp. 1-7, Aug. 1, 2001.
Bavoil et al., "Multi-Fragment Effects on the GPU using the k-Buffer," Scientific Computing and Imaging Institute, Univ. of Utah, ACM SIGGRAPH Symposium on Interactive 3D Graphics and Games, 2007, 8 pages.
Lassen, U.S. Appl. No. 13/875,810, filed May 2, 2013, titled "Graphics Processing Systems."
Nystad, et al., U.S. Appl. No. 13/875,822, filed May 2, 2013, titled "Graphics Processing Systems."
Engh-Halstvedt, U.S. Appl. No. 13/875,831, filed May 2, 2013, titled "Graphics Processing Systems."
Amendment dated Oct. 26, 2016, in U.S. Appl. No. 13/875,822, filed May 2, 2013.
Final Office Action dated Dec. 29, 2016, in U.S. Appl. No. 13/875,822, filed May 2, 2013.
Notice of Allowance dated Nov. 22, 2016, in U.S. Appl. No. 13/875,810, filed May 2, 2013.
Amendment dated Mar. 29, 2017, in U.S. Appl. No. 13/875,822, filed May 2, 2013.

* cited by examiner

GRAPHICS PROCESSING SYSTEMS

This application is a continuation-in-part application of U.S. patent application Ser. No. 13/875,810, "Graphics Processing Systems," filed on May 2, 2013, by Lassen, et al., which is incorporated herein by reference in its entirety.

BACKGROUND

The technology described herein relates to graphics processing systems, and in particular to tile-based graphics processing systems.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

As is known in the art, graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

The processing stages of the graphics processing pipeline may, e.g., be in the form of fixed-function units (hardware), or some or all of the functional units may be programmable (be provided by means of programmable circuitry that can be programmed to perform the desired operation). For example, a graphics processing pipeline may include programmable vertex and/or fragment shaders for performing desired vertex and/or fragment shading operations.

A tile-based graphics processing pipeline will also include one or more so-called tile buffers that store rendered fragment data at the end of the pipeline until a given tile is completed and written out to an external memory, such as a frame buffer, for use. This local, pipeline memory is used to retain fragment data locally before the data is finally exported to external memory.

The data in the tile buffer is usually stored as an array of sample values, with different sets of the sample values corresponding to and being associated with respect output pixels of an array of output pixels. There may, e.g., be one sample per pixel position, but more typically there will be multiple, e.g. 4, samples per pixel, for example where rendering outputs are generated in a multisampled fashion.

The tile buffer may store, e.g., a colour buffer containing colour values for the tile in question, and a depth buffer storing depth values for the tile in question.

In order to facilitate the writing back of rendered graphics data from the tile buffers to external memory, such as a frame buffer, a graphics processing pipeline will typically include write out circuitry coupled to the tile buffer pipeline memory for this purpose. The graphics processing pipeline may also be provided with fixed-function downsampling circuitry for downsampling the locally stored data before it is written out to external memory where that is required (as may, e.g., be the case where a frame to be displayed is rendered in a supersampled or multisampled manner for anti-aliasing purposes).

One issue that arises in the context of graphics processors, particularly for graphics processors that are to be used in lower power and portable devices, is the bandwidth cost of writing data to external memory from the graphics processing pipeline and for the converse operation of reading data from external memory to the local memory of the graphics processing pipeline (this latter may be required, e.g., for certain graphics processing operations such as downsampling and deferred shading and lighting). Bandwidth consumption can be a big source of heat and of power consumption, and so it is generally desirable to try to reduce bandwidth consumption for external memory reads and writes in graphics processing systems.

Various techniques have accordingly already been proposed to try to reduce bandwidth consumption for external memory reads and writes in graphics processing systems. These techniques include, for example, using texture and frame buffer compression to try to reduce the amount of data that must be written/read, and/or trying to eliminate unnecessary external memory (e.g. frame buffer) read and write transactions (operations).

Notwithstanding these known techniques, the Applicants believe that there remains scope for further improvements for reducing bandwidth consumption by graphics processing pipelines, and in particular by tile-based graphics processors when performing real-time graphics processing operations.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
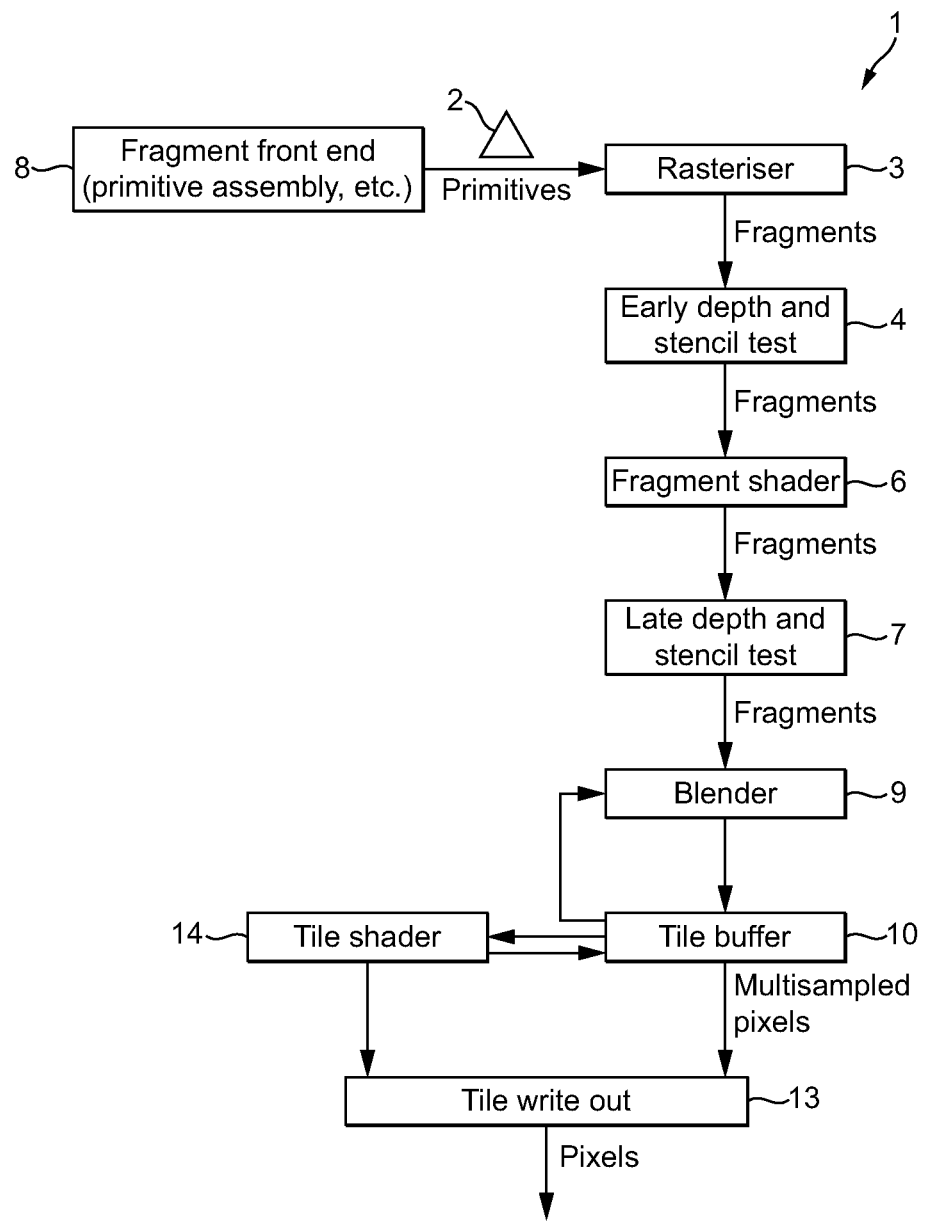
FIG. 1 shows schematically a graphics processing pipeline that can be operated in the manner of the technology described herein.

A first embodiment of the technology described herein comprises a tile-based graphics processing pipeline comprising:
    a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
    a tile buffer configured to store rendered fragment data locally to the graphics processing pipeline prior to that data being written out to an external memory, the tile buffer storing data values for an array of sample positions, with respective sets of the sample positions corresponding to and being associated with respective pixels of an output data array that the rendered fragment data relates to;
    a write out stage configured to write data stored in the tile buffer to an external memory; and
    a programmable processing stage operable under the control of graphics program instructions to, for respective pixel positions that data stored in the tile buffer represents, read data stored in the tile buffer for one or more sampling positions that are not associated with the pixel position in question, perform a processing operation using the read sampling position data, and write the result of the processing operation into the tile buffer or to an external memory.

A second embodiment of the technology described herein comprises a method of operating a tile-based graphics processing pipeline that comprises:
    a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
    a tile buffer configured to store rendered fragment data locally to the graphics processing pipeline prior to that data being written out to an external memory, the tile buffer storing data values for an array of sample positions, with respective sets of the sample positions corresponding to and being associated with respective pixels of an output data array that the rendered fragment data relates to;
    a write out stage configured to write data stored in the tile buffer to an external memory; and
    a programmable processing stage operable to, in response to one or more graphics program instructions, read fragment data stored in the at least one tile buffer, perform a processing operation using the read fragment data, and write the result of the processing operation into the tile buffer or to an external memory;
    the method comprising:
        issuing graphics program instructions to the programmable processing stage to cause the programmable processing stage to, for respective pixel positions that data stored in the tile buffer represents, read data stored in the tile buffer for one or more sampling positions that are not associated with the pixel position in question, perform a processing operation using the read sampling position data and write the result of the processing operation into the tile buffer or to an external memory; and
        the programmable processing stage in response to the graphics program instructions, for respective pixel positions that data stored in the tile buffer represents, reading data stored in the tile buffer for one or more sampling positions that are not associated with the pixel position in question, performing a processing operation using the read sampling position data and writing the result of the processing operation into the tile buffer or to an external memory.

The graphics processing pipeline of the technology described herein includes a programmable processing stage that is able directly to read and process data from the tile buffer to, for respective pixel positions that data stored in the tile buffer represents, read data stored in the tile buffer for one or more sampling positions that are not associated with the pixel position in question, and perform a processing operation using the read sampling position data. By providing a programmable processing stage that is operable to read fragment data stored in a tile buffer to perform a processing operation on that read fragment data in this way enables graphics processing operations to be performed upon fragment data stored in the tile buffer without the need, for example, for storage and subsequent re-storage of that fragment data in external memory, such as the frame buffer. This can then allow a range of graphics processing operations to be carried out in a much more bandwidth conservative way by eliminating the need for reads and writes to external memory. This in turn can lead to increased system performance and reduced power consumption.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The tile buffer will store, as is know in the art, an array or arrays of sample values for the tile in question. These sample values are usually, and in an embodiment are, grouped into sets of sample values (such as groups of 2×2 sample values) that are each associated with a respective (e.g. display) pixel in the tile in question. The sample values may, e.g., comprise colour values (a colour buffer), depth values (a depth buffer), etc.

The write out unit operates to write the data in the tile buffer (once the data in the tile buffers is complete) out to external (main) memory (e.g. to a frame buffer), as is known in the art. This may include, as is known in the art, downsampling (averaging), either in a fixed or in a variable fashion, the sample values in the tile buffer to the final output (pixel) value to be written to the main memory (e.g. frame buffer) and/or other output, if desired.

The external memory should be and in one embodiment is one or more memories external to the graphics processing pipeline, to which a write out unit can write data, such as a frame buffer. The external memory is in one embodiment provided as or on a separate chip (monolithic integrated circuit) to the graphics processing pipeline (i.e. to the graphics processor) (and as or on a separate chip to the chip (integrated circuit) on which the local memory (e.g. tile buffer) of the graphics processing pipeline resides). The external memory in one embodiment comprises a main memory (e.g. that is shared with the central processing unit (CPU)), e.g. a frame buffer, of the overall graphics processing system.

The programmable processing stage that processes the data in the tile buffer may comprise any suitable programmable hardware element such as programmable processing circuitry. This programmable processing stage may be provided as a separate circuit element to other programmable stages of the processing pipeline such as a fragment shader. However, it may also be at least partially formed of shared programmable graphics processing circuitry. In an embodiment both the renderer and the programmable processing stage share programmable processing circuitry and in an embodiment comprise the same physical circuit blocks (that are then differently programmed to serve as the fragment shader (renderer) and the programmable processing stage).

The operation of the programmable processing stage is in an embodiment achieved by executing one or more graphics processing threads using the programmable graphics processing stage, in an embodiment before the output values are written to the frame buffer memory. Thus, fragment data values generated within the graphics processing pipeline and stored within the tile buffers are further processed by the programmable processing stage to provide output results using graphics processing threads executed by the programmable processing stage that operate on the data values within the tile buffer without requiring a write out to any external memory.

Thus, the programmable processing stage in an embodiment comprises programmable graphics processing circuitry that executes respective graphics processing threads (under the control of graphics program instructions). Each thread in an embodiment processes a respective pixel (pixel position) within the tile buffer. For a given tile, some or all of the pixel positions may be processed, as desired.

The programmable processing stage that reads values from the tile buffer in an embodiment operates in a similar manner to other programmable stages of the processing pipeline, such as a fragment shader, but is able to read and write to the tile buffer (directly).

The programmable processing stage is able to read values from the tile buffer to, for respective pixel positions that data stored in the tile buffer represents, read data stored in the tile buffer for one or more sampling positions that are not associated with the pixel position in question, and perform a processing operation using the read sampling position data (under the control of appropriate graphics program instructions). This means that the programmable processing stage when performing a processing operation for a given pixel position (when executing a thread for a given pixel position) is not constrained to read (use) only the sample values in the tile buffer associated with that pixel position, but can read (and use) sample values associated with other pixel positions as well. In other words, the programmable processing stage effectively has access to the tile buffer on a "random access" basis, rather than, e.g., only having very limited access to only the current pixel's data.

Thus the programmable processing stage, when executing a graphics processing thread to generate a result for a given pixel (pixel) position in an embodiment reads and uses at least one sample value stored in the tile buffer that is associated with a different pixel (pixel position) (to the given pixel (pixel position)). In an embodiment, sample values from plural different pixels (pixel positions) are read and used.

The programmable processing stage could read a single sample value for a respective processing operation, but it in an embodiment reads a plurality of sample values from the tile buffer as inputs to its processing operation (these may all be for the same pixel position but in an embodiment are for plural different pixel positions). The processing operation executed by the programmable processing stage may generate a single or plural output values.

The programmable processing stage can write the results of its processing operations back to the tile buffer and/or to external memory. In an embodiment, the programmable processing stage can write the results of its processing directly to external memory using a generic load/store to memory from the programmable processing stage.

Where the results are written back to the tile buffer, the values may then remain in the tile buffer to be written out subsequently, or may be read back in by the programmable processing stage for further processing operations, as desired. The results could be written back to the tile buffer and then written out to external memory by triggering fixed function write out from the tile buffer.

Where the results are written back to the tile buffer, the programmable processing stage can in an embodiment write the results to one or more than one sampling and/or pixel position in the tile buffer, and in an embodiment to the respective and/or to one or more different pixel positions in the tile buffer (under the control of appropriate graphics program instructions). Thus, the programmable processing stage can in an embodiment write the results to any location in the tile buffer (and not just either the current location (pixel position) or the location(s) (pixel position(s)) that the data is being read from).

Thus the programmable processing stage is in an embodiment configured to be able to have full read access to every pixel and sample in the tile buffer (without generating bandwidth traffic to external memory). It is in an embodiment also then correspondingly able to have full write access to every pixel and sample in the tile buffer without generating bandwidth traffic to external memory.

Similarly, in an embodiment the programmable processing stage is operable to, in response to graphics program instructions, read for use as input to its process sample values from plural different pixels within the stored tile in question, and/or to write its output results to sample values associated with plural different pixels in the stored tile in question.

In an embodiment, the programmable processing stage that is operable to read values from the tile buffer is configured also to be able to read values from external memory (and have full random access to external memory). This may be achieved, e.g., by providing appropriate program instructions to the programmable processing stage.

In an embodiment, fixed function write out of a specific tile and/or render target from the tile buffer can be prevented. This may be useful where, for example, the data stored in a tile and/or render target is not in practice needed externally to the graphics processing pipeline, or that data may be written out by other means, such as by the programmable processing stage doing the write out using external memory accesses. Preventing the fixed function write out of a tile and/or render target could be performed on a static basis (i.e. predetermined to statically have write out disabled), or it could be preventable on a dynamic basis (in use). Similarly, the fixed function write out of a tile and/or render target could be, e.g., prevented across all the tiles in common, or selected dynamically, on a per tile basis.

In an embodiment, the programmable processing stage can operate to prevent fixed function write out of a specific tile and/or render target from the tile buffer. This is in an embodiment in response to a particular graphics program instruction to the programmable processing stage. This will then allow an applications programmer, for example, to optionally and dynamically prevent fixed function write out of a specific tile and/or render target from the tile buffer, e.g. on a per-tile basis.

The operation of the programmable processing stage is in an embodiment triggered by including an appropriate command in the tile list of the tile or tiles for which the processing operation is to be performed. In response to this command, the graphics processing pipeline in an embodiment first waits until all fragment processing operations (fragment shaders) in flight are committed to the tile buffer (i.e. until the rendering of fragments for the tile has been completed—this ensures that the data in the tile buffer is complete before the tile buffer data processing operation is commenced). The programmable processing stage then executes its processing operation on the values in the tile buffer. This is in an embodiment done by spawning a given number of threads with an input vector distinguishing them (the input vector could for instance represent the region of the tile buffer that the thread is supposed to be working on). Then, once all the tile buffer data processing threads have completed, "normal" rendering can be resumed as usual.

In an embodiment, it is also possible for the programmer to signal on the pipeline that the processing of the values in the tile buffer by the programmable processing stage has been completed, so that further rendering operations can then be performed.

In an embodiment, an API (Application Programming Interface; the interface through which an application can use this feature) mechanism is used to trigger and control the operation of the programmable processing stage. For example, appropriate API calls and commands can be configured to trigger the respective tile buffer data processing operation, and the addition, e.g., of appropriate commands to the tile lists for the tiles in question.

For example, a "begin tile processing" command could be added to the tile (command) lists of the affected tiles in response to a particular API call which invokes the tile buffer data processing operation (and in an embodiment, this is what is done). This API call in an embodiment also specifies the region of the screen that the tile buffer data processing operation is to operate on.

The processing operation that is specified by the one or more graphics program instructions and performed by the programmable processing stage using the values stored in the tile buffer can be any suitable such operation, such as any multisampled anti-aliasing operation, a multisampled high dynamic range rendering operation, a linear blending operation, a deferred shading operation, a format conversion operation, a YUV conversion operation, compression of pixel values, mip-map generation (render-to-mip-map chain), custom HDR multisample resolve and tone mapping, (box) blur depth field effects, image analysis and filtering functions, render target colour space conversion, etc.

In one embodiment, the processing operation comprises an operation to compress the data values in the tile buffer before they are written out to external memory (to generate a compressed representation of the tile buffer values for writing to external memory).

In one such embodiment, a "content-aware" compression process is performed by causing the programmable processing stage to execute an appropriate set of graphics program instructions to achieve that. In this case, the graphics processing operation executed by the programmable processing stage could, e.g., analyse the content of the tile buffer, apply a content-aware compression scheme and decide what to write out using random memory access. For example, for different types of buffer (shadow buffer, colour buffer, normal buffer), different compression schemes can be appropriate and different compression artefacts can be tolerable. This can allow for much better compression than fixed function compression hardware and potentially also allow removal of fixed function compression hardware.

One use of the programmable processing stage is to perform texture compression (where the graphics processing pipeline is performing a render-to-texture operation). In this case the programmable processing stage can be used to perform the texture compression on the rendered tiles in the tile buffer directly such that only the compressed image is written out to external memory, thereby reducing external memory bandwidth for the render-to-texture operation where the final texture is to be compressed.

In this case, the graphics processing pipeline is in an embodiment controlled to firstly generate the render-to-texture input for respective tiles to be generated in the normal manner, but then an appropriate tile buffer processing command (and program) used to trigger the programmable processing stage to perform the appropriate compression of the rendered tile data for each tile after it is written into the tile buffer before the rendered tile is written out to external memory. In this case, the programmable processing stage would execute the appropriate compression algorithm, such as the ASTC compression algorithm.

The compressed data generated by the programmable processing stage could either then be written out to external memory directly, e.g. using store instructions, or back to a separate memory area in the tile buffer for writing out by the tile write out stage.

It is believed that using such an arrangement for performing texture compression "on the fly" and "on-chip" may be new and inventive in its own right.

Thus, another embodiment of the technology described herein comprises a method of generating compressed texture data for a render-to-texture output using a tile-based graphics processing pipeline that comprises:
- a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
- a tile buffer configured to store rendered fragment data locally to the graphics processing pipeline prior to that data being written out to an external memory, the tile buffer storing data values for an array of sample positions, with respective sets of the sample positions corresponding to and being associated with respective pixels of an output data array that the rendered fragment data relates to;
- a write out stage configured to write data stored in the tile buffer to an external memory; and
- a programmable processing stage operable to, in response to one or more graphics program instructions, read fragment data stored in the at least one tile buffer, perform a processing operation using the read fragment data, and write the result of the processing operation into the tile buffer or to an external memory;

the method comprising
rendering a tile of the texture to be output in an uncompressed form using the graphics processing pipeline and storing the rendered uncompressed tile texture data in the tile buffer;
using the programmable processing stage to read the stored texture data and to perform a compression operation on the read texture data, and writing out the result of the compression operation to the tile buffer or to an external memory, thereby to provide a compressed version of the texture; wherein:
the reading of the uncompressed texture data from the tile buffer to generate the output, compressed texture data comprises reading texture data samples stored in the tile buffer associated with plural different pixels in the tile buffer.

Another embodiment of the technology described herein comprises a tile-based graphics processing pipeline comprising:
- a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
- a tile buffer configured to store rendered fragment data locally to the graphics processing pipeline prior to that data being written out to an external memory, the tile buffer storing data values for an array of sample positions, with respective sets of the sample positions corresponding to and being associated with respective pixels of an output data array that the rendered fragment data relates to;
- a write out stage configured to write data stored in the tile buffer to an external memory; and
- a programmable processing stage operable to, in response to one or more graphics program instructions, read rendered uncompressed tile texture data that is stored in the tile buffer, perform a compression operation on the read texture data, and write out the result of the compression operation to the tile buffer or to an external memory, thereby to provide a compressed version of the texture; wherein:
the reading of the uncompressed texture data from the tile buffer to generate the output, compressed texture data comprises reading texture data samples stored in the tile buffer associated with plural different pixels in the tile buffer.

As will be appreciated by those skilled in the art, these embodiments of the technology described herein may include any one or more or all of the features of the technology described herein described herein, as appropriate.

The texture compression that is performed in these embodiments of the technology described herein may be any suitable form of texture compression. In an embodiment the process is used to perform ASTC (Adaptive Scaleable Texture Compression) compression on the fly.

As will be appreciated by those skilled in the art, the uncompressed texture generation and then compression processes should be repeated for each tile of the texture to be generated, such that a final output compressed version of the texture can be generated.

In another embodiment, the operation that is performed by the programmable processing stage comprises content-aware lossy transaction elimination (i.e. the (attempted) elimination of read and/or write operations (transactions) in the graphics processing pipeline, for example to avoid the writing out of identical and/or similar tiles to external memory). In this case custom transaction elimination hashing functions to allow elimination of tiles that are similar (e.g. without being 100% equal) could be used to facilitate a lossy transaction elimination process with tolerable artefacts for the use case in question. For example, when rendering a smoke cloud, artefacts that are caused by imperfect transaction elimination might not be noticeable.

In another embodiment, the processing operation that is executed by the programmable processing stage comprises a deferred shading (e.g. deferred lighting) operation. Indeed, the technology described herein facilitates performing such operations being done on-chip with zero bandwidth cost, instead of writing out and reading back huge G-buffers, thereby enabling these techniques to be applied in the embedded space.

To facilitate this, in an embodiment, the programmable processing stage supports at least one of, and in an embodiment both of, multiple render target inputs and multiple render target outputs, and the tile buffer is configured to be able to (and configurable to) store multiple render targets simultaneously. The programmable processing stage is then in an embodiment operable to, in response to and under the control of graphics program instructions, read data values from at least two (and in an embodiment all) of the stored render targets for the tile in question, perform a processing operation on those data values, and then write the output result to a further render target in the tile buffer or to external memory.

This facilitates using the programmable processing stage to perform deferred shading operations.

As known in the art, when doing deferred shading, the application performs multiple render passes, usually using multiple render targets in a first rendering passes to output colour, depth, surface normals, and potentially other attributes, to separate render targets. It then reads in the outputs from the first rendering pass to do complex light calculations and compositions to produce the final result. This requires a lot of bandwidth to read and write all of the render targets (as an application will usually, for example, write out multiple render targets in the first pass, and then use render targets as textures in the second pass to generate the final result).

However, by storing multiple render targets in the tile buffer, reading and processing the contents of those buffers directly from the tile buffer using the programmable processing stage and then writing the resulting image from the programmable processing stage to a further render target in the tile buffer, the entire read bandwidth if reading the multiple render targets from external memory can be saved.

In an embodiment, the programmable processing stage also operates to disable and prevent the fixed function write out of the first set of render targets to external memory (e.g. and in an embodiment, in the manner discussed above). This then also saves on write bandwidth for those render targets and the memory footprint of those render targets in the external memory. In an embodiment the arrangement is such that only the final (output result) render target is written to external memory.

It is accordingly believed that the technology described herein will allow deferred shading and lighting to be performed in a particularly bandwidth efficient manner, as it can allow the entire deferred shading process to be done on the pipeline on a tile-by-tile basis, with zero external bandwidth cost.

In these embodiments, the programmable processing stage can in an embodiment read sample values associated with multiple pixels from one render target, as well as associated with pixels from multiple render targets.

In another embodiment, the processing operation that is performed by the programmable processing stage comprises an operation that uses the read sampling position data to generate metadata, i.e. data that describes some aspect of the read sampling position data. In one embodiment, the processing operation generates per-tile metadata, i.e. data that describes some aspect of a tile of rendered graphics data.

As is known in the art, metadata is useful in and generated for various graphics processing operations. For example, one common technique involves, for each tile of the rendered graphics data, generating a histogram of the brightness of the pixels within the tile. The histograms can then be used, e.g., to control the brightness of a backlit display screen.

However, in prior art methods, metadata is generated once all of the tiles for a frame have been generated and written out to the external memory (e.g. to the frame buffer). The generation of metadata in these methods typically involves reading all or some of the rendered graphics data from the external memory, processing the data to generate metadata, and then writing the metadata back to the external memory. However, the bandwidth cost of reading the rendered graphics data from the external memory and/or writing the metadata data to the external memory can be relatively high.

Arranging the programmable processing stage of the technology described herein to generate metadata enables the metadata to be generated within the graphics processing pipeline (i.e. within the graphics processor, or "on-chip"). This then means that there is no need for the graphics processor to subsequently read the rendered graphics data from the external memory in order to generate the metadata. Furthermore, in graphics processing operations in which only the metadata is required for further processing (i.e. where the rendered graphics data is not itself required), the writing of the rendered graphics data to the external memory can be avoided.

Thus, the graphics processing pipeline of the technology described herein can allow metadata to be generated in a much more bandwidth conservative way by eliminating the need for reads and writes to external memory. This in turn can lead to increased system performance and reduced power consumption.

The Applicants furthermore believe that the generation of metadata within the graphics processing pipeline (i.e. within the graphics processor, or "on-chip") may be new and advantageous in its own right.

Thus, another embodiment of the technology described herein comprises a tile based graphics processing pipeline comprising:
- a plurality of processing stages, including at least a rasteriser that rasterises input primitives to generate graphics fragments to be processed, and a renderer that processes fragments generated by the rasteriser to generate rendered fragment data;
- a tile buffer configured to store rendered fragment data locally to the graphics processing pipeline prior to that data being written out to an external memory;
- a write out stage configured to write data stored in the tile buffer to an external memory; and
- a programmable processing stage operable under the control of graphics program instructions to read data stored in the tile buffer, and perform a processing operation using the read data to generate metadata.

Another embodiment of the technology described herein comprises a method of generating metadata using a tile based graphics processing pipeline that comprises:

a plurality of processing stages, including at least a rasteriser that rasterises input primitives to generate graphics fragments to be processed, and a renderer that processes fragments generated by the rasteriser to generate rendered fragment data;

a tile buffer configured to store rendered fragment data locally to the graphics processing pipeline prior to that data being written out to an external memory;

a write out stage configured to write data stored in the tile buffer to an external memory; and a programmable processing stage operable under the control of graphics program instructions to read data stored in the tile buffer, and perform a processing operation using the read data to generate metadata;

the method comprising:

issuing graphics program instructions to the programmable processing stage to cause the programmable processing stage to read data stored in the tile buffer, and perform a processing operation using the read data to generate metadata; and the programmable processing stage in response to the graphics program instructions, reading data stored in the tile buffer, and performing a processing operation using the read data to generate metadata.

As will be appreciated by those skilled in the art, these embodiments of the technology described herein may include any one or more or all of the optional features described herein, as appropriate.

The programmable processing stage is in an embodiment operable under the control of graphics program instructions to write the metadata into the tile buffer or to an external memory. Similarly, the method in an embodiment further comprises issuing graphics program instructions to the programmable processing stage to cause the programmable processing stage to write the metadata into the tile buffer or to an external memory, and the programmable processing stage in response to the graphics program instructions, in an embodiment writing the metadata into the tile buffer or to an external memory.

The programmable processing stage that generates the metadata in an embodiment reads data for a plurality of sampling positions within the tile buffer, in an embodiment data for all sampling positions of a tile stored within the tile buffer (e.g. all sampling positions within the tile buffer) (and in one embodiment, data for sampling positions within a plurality of tiles), as inputs to its processing operation. Thus, the metadata is in an embodiment generated using data for a plurality of sampling positions within the tile buffer, in an embodiment data for all sampling positions of a tile stored within the tile buffer (e.g. all sampling positions within the tile buffer) (and in one embodiment, data for sampling positions within a plurality of tiles).

The processing stage may read and use one or more types of data (e.g. colour values, depth values, etc.) generated by the renderer and stored in the tile buffer as inputs to its processing operation, and for generating the metadata.

The metadata that is generated by the processing operation may be any suitable and desired metadata. In embodiments where the metadata comprises per-tile metadata, the per-tile metadata may be any suitable and desired metadata that can be derived from and associated with an individual tile.

In one embodiment, the processing operation generates metadata in the form of a histogram. A histogram may be generated, for example, by counting the number of regions (e.g. sampling positions or groups of sampling positions), e.g. within a tile, having a value of a particular characteristic (e.g. that falls within each bin of the histogram). The number of bins used, and/or the ranges for each of the bins can be chosen as desired, and should in an embodiment be supplied to the programmable processing stage that generates the metadata.

Additionally or alternatively, the metadata may take the form of a bitmap or a bitmask, e.g. indicative of regions (e.g. sampling positions or groups of sampling positions), e.g. of a tile, having a particular characteristic.

In one embodiment, the metadata may indicate minimum and/or maximum values of a particular characteristic or property of a tile or of regions (e.g. groups of sampling positions) within a tile. In this embodiment, the processing operation may comprise evaluating the read sampling position data, and determining the minimum and/or maximum values of the particular characteristic or property. In this embodiment, the metadata may take the form of one or more individual values.

In one embodiment, the metadata may indicate a total value of a particular characteristic or property of a tile or of regions within a tile. In this embodiment, the processing operation may comprise summing the relevant sampling position data.

In one embodiment, the metadata may indicate an average value of a particular characteristic or property of a tile or of regions within a tile. In this embodiment, the processing operation may comprise summing sampling position data values, and then dividing the resultant value by the number of sampling position data values summed to generate an average value. As will be appreciated, the processing operation in this embodiment is equivalent to applying a box filter having the size of the tile.

In one embodiment, the metadata may take the form of a similarity flag, e.g. indicating whether all sampling positions within a tile or regions of a tile have the same value of a particular characteristic or property. In another embodiment, the similarity flag may indicate whether all sampling positions within a tile or regions of a tile have similar values of a particular characteristic or property. In this embodiment, the processing operation may comprise using a fixed or programmable threshold to generate the metadata (e.g. to be used to determine whether the sampling position values are to be considered to be similar or not).

In one embodiment, the per-tile metadata may comprise a modification flag, indicating whether or not a change (or only relatively small changes) has been made to the tile. For example, writing the rendered fragment data to the tile buffer may or may not change existing data stored in the tile buffer, and the per-tile metadata may indicate whether or not any such change (or only relatively minor changes) has been made. In this embodiment, the processing operation will comprise, e.g. determining whether a change (or a particular type of change) has been made to the tile, and if it is determined that a change has been made, setting the flag. This metadata may be used, e.g. to suppress the output of rendered fragment data (i.e. the tile) from the tile buffer, e.g. if there is no change (or only relatively few changes) between tiles.

In one embodiment, the metadata relates to the luminosity of regions (e.g. sampling positions or groups of sampling positions) within a tile (i.e., the particular characteristic or property may comprise luminosity). In one such embodiment, a histogram of the luminosity values of sampling positions (or pixels) of a tile is generated. As discussed above, this can be used. e.g., to control the brightness of a backlit display screen. In another embodiment, the metadata may comprise minimum and maximum values of luminance for a tile.

In another embodiment, the metadata relates to the transparency of regions (e.g. sampling positions or groups of sampling positions) of a tile (i.e. the particular characteristic or property may comprise transparency). In one such embodiment, the metadata may indicate whether all of a tile and/or whether regions (e.g. sampling positions or groups of sampling positions) of a tile are completely opaque, and/or are completely transparent and/or neither. Such information may be used, e.g., to control further graphics processing operation that are carried out on the tile. For example, further operations on the tiles and/or regions indicated as completely opaque and/or indicated as completely transparent may be skipped.

Alternatively, the metadata may indicate whether all of a tile and/or whether regions of a tile are similarly, e.g. "almost completely", opaque, and/or whether all of a tile and/or whether regions of a tile are similarly, e.g. "almost completely", transparent. Accordingly, in this embodiment, the processing operation that generates the metadata may use one or more fixed or programmable threshold values to generate the metadata. This information may be used in the manner discussed above to control further graphics processing operation that are carried out on the tile. This is possible because in some circumstances, the differences between "almost completely" opaque and fully opaque regions of a tile, and between "almost completely" transparent and fully transparent regions of a tile, may not be visible.

In these embodiments, the metadata may take the form of one or more histograms, or in an embodiment one or more bitmasks or flags, e.g. indicating the presence (or absence) of regions (sample positions or pixels) of the tile that are (completely and/or relatively) opaque and/or transparent and/or neither.

In one embodiment, the metadata relates to the depth of regions (e.g. sampling positions or groups of sampling positions) within a tile (i.e., the particular characteristic or property may comprise depth). For example, in one embodiment, the metadata may comprises minimum and maximum values of depth for a tile.

In one embodiment, the metadata relates to domain transformed information of a tile or region of a tile, such as frequency domain transformation information (i.e., the particular characteristic or property may comprise domain transformed information). In this embodiment, the processing operation may comprise transforming the tile data from a spatial grid into another domain, such as 2D spatial frequency, using DCT, wavelet or other similar techniques. In one such embodiment, the metadata comprises a histogram of frequency data. Such metadata may be used, e.g., in dynamic display processing, and/or encoding of display streams.

In one embodiment, the metadata relates to colour values within a tile (i.e., the particular characteristic or property may comprise colour). In one such embodiment, the metadata may comprise the average colour value of a tile or a region of tile. This metadata may be used, e.g., for ambient colour enhancement of the displayed image.

In various embodiments, multiple different types of metadata may be generated, e.g. from one or more passes over the read sampling position data. Each piece of metadata may be written out to the tile buffer or to the external memory separately or together.

Where each sampling position of a tile has plural data values (e.g. data channels) associated with it, then in one embodiment, the metadata is based on (e.g. calculated from) all the data values (data channels). However, it would also be possible to derive metadata for some but not all of the data channels, e.g. for a single data channel (e.g. colour) and/or separate metadata values could be generated for each data channel (e.g. colour channel).

It would also be possible to derive metadata for a set of plural tiles, if desired.

The graphics processing pipeline may also contain any other suitable and desired processing stages that a graphics processing pipeline may contain such as an early depth (or an early depth and stencil) tester, a late depth (or depth and stencil) tester, a blender, etc.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 shown in FIG. 1 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor, as is known in the art.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4×anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

The downsampling and writeout unit 13 downsamples the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 in accordance with embodiments of the technology described herein will now be described.

As shown in FIG. 1, the graphics processing pipeline 1 also includes a programmable processing stage in the form of a tile shader 14 that can read stored values in the tile buffer 10 to perform processing operations on those values, and then write the results of its processing operation either back to the tile buffer 10 or out to main memory via the tile write out unit 13. This tile shading operation accordingly makes use of the rendered fragment values produced by the fragment shader, etc., and stored in the tile buffer 10 as its inputs without requiring those fragment values to be written out to external memory and then read back through the graphics processing pipeline 1 in order to perform the tile shader processing operation. This allows a wide variety of processing operations to be performed with reduced memory bandwidth and energy consumption.

The tile shader stage 14 in the present embodiment shares processing circuitry with the fragment shader 6. Thus the tile shader 14 and the fragment shader 6 are provided by shared hardware in the form of a programmable hardware stage that can execute one sequence of graphics processing threads to first generate and then store in the tile buffer 10 fragment date values, and then execute a second sequence of graphics processing threads to process the fragment data values within the tile buffer 10.

(In other words, there is a programmable hardware element (circuitry) that can be configured by appropriate graphics program instructions to perform fragment shading operations (thereby acting as the fragment shader 6) or to perform tile shading operations (thereby acting as the tile shader 14). This programmable hardware element supports multi-threaded processing and so can serve both these functions and others.)

In the present embodiment, the tile shader 14 is implemented by extending the OpenGL ES shading language with a new shader type, GL_TILE_SHADER, and new built-in variables. This allows support for the tile shader stage 14 to be fitted within the existing shader programming model. This new shader type is not attached to the program object, but rather to the frame buffer object. In the present embodiment the tile shader 14 works like a regular OpenGL ES shader, but allows functions for reading and writing to generic memory, random write-access to textures using image write functions, and functions for reading and writing to the tile buffer.

The tile shader 14 is able to read as inputs for any given processing operation (e.g. thread) any location within the tile in the tile buffer 10, and also to write data to any location within the tile that is stored in the tile buffer 10. This is facilitated in the present embodiment by means of the following API functions:

gl_ReadTilePixelColor (int2 loc, cb, ms)
gl_ReadTilePixelDepth (int2 loc, ms)
gl_WriteTilePixelColor (int2 loc, cb, ms, color)
gl_WriteTilePixelDepth (ing2 loc, ms, color)
where
cb=index of colour buffer (this is used where there are multiple render targets (multiple colour buffers) stored in the tile buffer 10),
ms=index of sample (where multisampling is facilitated) and
loc=pixel coordinates in screen space.

Write out from the tile shader 14 can be done either with generic load/store to memory from the tile shader 14 or by writing the data back to tile buffer 10 and then triggering fixed function write out by the write out unit 13.

The tile shader 14 is also able to trigger or prevent a regular write-out of specific tile buffer components. This is achieved in the present embodiment by calling a function, gl_WriteOutColorTile (cb, [s]), gl_WriteOutDepthTile ([s]), where cb is the colour buffer index and s is the sample index to use (this index controls what sample to write out as the final value). These functions flag the tile for write out (or not) of the colour or depth buffer. (The write out (if required) occurs after the tile shader has finished its processing.)

In the present embodiment, the operation of the tile shader 14 is triggered by use of an API call for that purpose:
glResolveTiles (x, y, w, h, xthreads, ythreads)

The effect of this "resolve" API call is that a "resolve" (begin tile processing/tile shader triggering) command is added to the command list of each tile containing pixels within the rectangle indicated in the resolve API call ((x, y, w, h) in pixel coordinates).

Then, when a tile is being processed by the graphics processing pipeline and a "resolve" command is encountered in the tile command list, the graphics processing pipeline 1 operates as follows.

First, it waits for all generated fragment threads for the current tile to complete and be committed to the tile buffer. This ensures that the tile buffer contains the final rendered data for the tile in question before the tile shader 14 begins its operation.

Tile shader threads are then issued for each location that lies within the current tile to execute the tile shader program for each location that lies within the current tile. Each thread performs the relevant tile shading process for a given pixel within the tile, and may access as its inputs data from sample positions associated with different pixels as well as or instead of the pixel it is actually "processing". Once all the tile shading threads have completed, the command list is then resumed.

The tile shader 14 can be used to perform any desired processing operation on the rendered tiles in the tile buffer 10 before they are written to external memory. Examples of such functions include content-aware frame buffer compression, content-aware lossy transaction elimination, deferred shading and lighting, mip-map generation, custom HDR multisample-resolve and tone mapping, (box) blur and depth-of-field effects, image analysis and filtering functions, render target colour space conversion, etc.

One use of the tile shader 14 is to perform texture compression (where the graphics processing pipeline 1 is performing a render-to-texture operation). In this case the tile shader 14 can be used to perform the texture compression on the rendered tiles in the tile buffer 10 directly such that only the compressed image is written out to external memory, thereby reducing external memory bandwidth for the render-to-texture operation where the final texture is to be compressed.

In this case, the graphics processing pipeline 1 should be controlled to firstly generate the render-to-texture input for respective tiles to be generated in the normal manner, but then an appropriate "resolve" tile shader command should be included to trigger the tile shader 14 to perform the appropriate compression of the rendered tile data for each tile in the tile buffer 10 before the rendered tiles are written out to external memory. In this case, the tile shader 14 would execute the appropriate compression algorithm, such as the ASTC compression algorithm. The tile shader 14 would accordingly read as inputs values for plural different pixels from the tile buffer to generate a compressed representation of that data.

The compressed data generated by the tile shader 14 could then either be written out to memory directly using store instructions, or back to a separate tile buffer area in the tile buffer 10 for writing out by the tile write out stage 13.

The process should be repeated for each tile of the texture to be generated, such that a final output compressed version of the texture can be generated.

Figure 2:
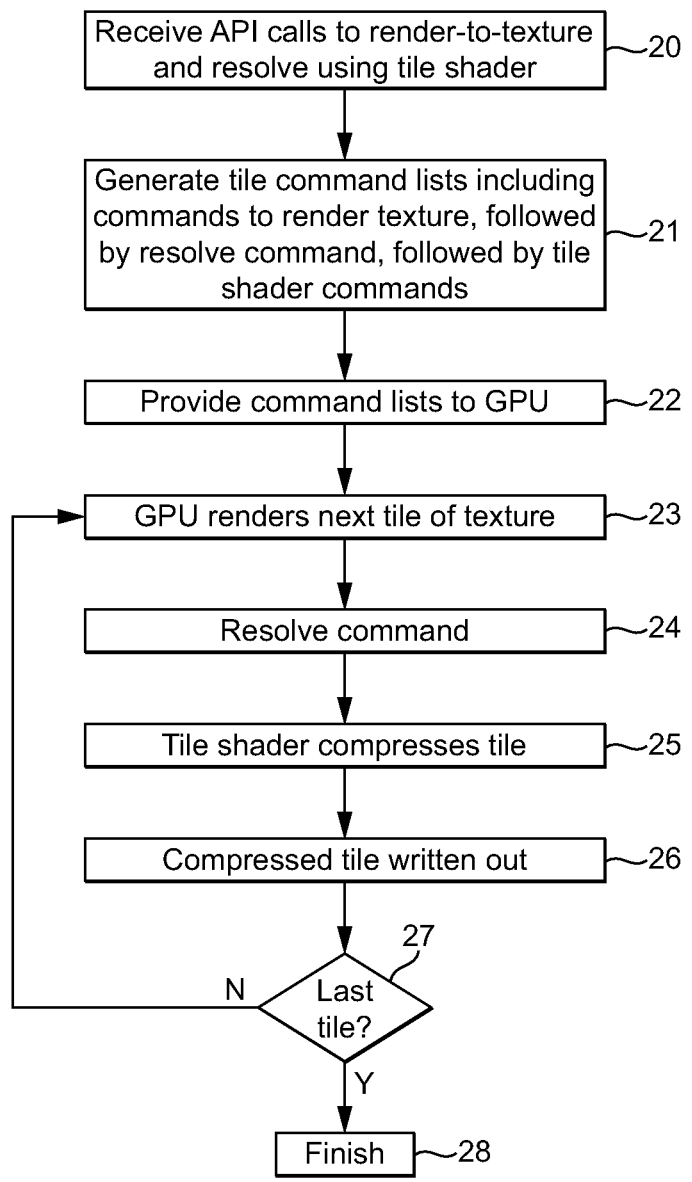
FIG. 2 shows schematically an embodiment of the operation of the graphics processing pipeline of FIG. 1.

FIG. 2 illustrates this process. Thus, as shown in FIG. 2, the driver for the graphics processing pipeline (that may, e.g., be running on a host processor) will receive API calls to perform a render-to-texture operation, and then perform a tile shader "resolve" operation to compress the rendered texture (step 20). In response to this, the driver will generate appropriate tile command lists, including commands to render the texture, followed by a "resolve" command to trigger the tile shader operation, and commands to cause the tile shader to perform the texture compression operation (step 21).

These command lists are then provided to the graphics processing pipeline (step 22) which then, in response to the commands, renders each tile of the texture in turn (step 23) to store the rendered tile data in the tile buffer. As each tile is rendered, when the graphics processing pipeline sees the tile "resolve" command (step 24), it waits until all the rendering operations in flight have been completed and then executes the appropriate tile shader program to compress the rendered tile data (step 25). The compressed representation of the tile data is then written out to external memory (step 26) and the process moves on to the next tile (step 27) until all the tiles for the texture have been processed (step 28).

Another use of the tile shader 14 in the present embodiment is to perform deferred shading. In this case, the tile shader 14 can be used to allow the entire deferred shading process to be done on a tile-by-tile basis, thereby saving significantly on external memory bandwidth for performing deferred shading. In this case, the tile buffer 10 is configured to be able to hold multiple render targets simultaneously such that multiple G-buffers and a colour buffer for accumulating the output results can be stored in the tile buffer 10 simultaneously. This may be achieved as desired. For example it may be that the tile buffer is of sufficient size that it can accommodate, in effect, colour buffers for multiple tiles in any event. In this case each tile colour buffer could be designated as an appropriate render target.

In this process the graphics processing pipeline 1 is first controlled to render to respective separate render targets, the rendered geometry (G-buffers) required for the deferred shading operation. This processing pass may generate, for example, render targets comprising colour, depth, surface normals, and other attributes that are then stored separately in the tile buffer 10. (As is known in the art, when performing deferred shading, these values are then used to do complex light calculations and composition to produce the final desired output result.)

Once these render targets have been generated for the tile in question, the tile shader 14 operation can then be triggered by including an appropriate resolve command in the tile command list, with the tile shader 14 being appropriately controlled to read data from the plural render targets in the tile buffer 10, process that data, and then write the processing result into a separate output colour buffer render target in the tile buffer 10.

In this operation, the tile shader 14 will accordingly read as input values stored sample values from some or all of the generated render targets that are stored in the tile buffer 10, perform a deferred shading operation using those values and then store the result of that operation in the separate output colour buffer that has been allocated for that purpose. Depending upon the exact deferred shading operation that is being performed, the tile shader 14 may read the same sample values associated with the same pixel or pixels in each render target and/or it may read sample values associated with different pixels in each render target. The tile shader 14 is configured to be able to perform either of these tasks under the control of appropriate graphics program instructions.

Once this operation has been completed, the tile shader 14 in an embodiment triggers the writing out of the output result render target to external memory, but disables writing the render targets that contain the G-buffers to memory, such that only the final tile that is to contribute to the frame buffer is written to memory. This can be achieved using the appropriate tile write functions discussed above. This saves both the read and write bandwidth to external memory that would otherwise be required for the multiple render targets that are generated in the first pass for the deferred shading operation.

Another use of the tile shader 14 in the present embodiment is to generate metadata, in an embodiment per-tile metadata. In this case, the tile shader 14 can be used to allow the metadata generation to be done within the graphics processor, or "on-chip", thereby saving significantly on external memory bandwidth for performing metadata generation.

When generating metadata, the tile shader 14 can be configured to read any of (all of) the data stored within the tile buffer 10 as inputs to its processing operation. For example, the tile shader 14 can read data for a plurality of sampling positions within the tile buffer 10, in an embodiment data for all sampling positions of a tile stored within the tile buffer 10 (e.g. data for all sampling positions within the tile buffer 10). The processing stage may read one or more types of data (e.g. colour values, depth values, etc.) generated by the renderer and stored in the tile buffer as inputs to its processing operation.

Examples of per-tile metadata include, but are not limited to the following.

Histogram generation: the number of sampling positions in a tile corresponding to various parameters (e.g. luminous intensity levels) is histogrammed. The number of histogram bins required, and/or the ranges for each bin can be supplied to the tile shader 14. A luminance histogram may be used for dynamic contrast and high-dynamic range display. A frequency histogram may be used in dynamic display processing, and in encoding of display streams.

Transparency information: the metadata may indicate whether all sampling positions (pixels) of a tile are completely opaque or completely transparent (or a mix of the two), and if this is the case, some of the subsequent processing operations may be skipped. The metadata may take the form of a histogram, or a simple bitmask indicating the presence or absence of sampling positions (pixels) in each class. The metadata may also indicate pixels which are "almost fully" opaque or "almost fully" transparent, since the differences with the fully opaque or transparent cases may not be visible in certain circumstances. In this case, programmable thresholds for opaque and transparent sampling position (pixel) detection can be supplied to the tile shader 14.

The metadata may indicate minimum and maximum values for properties of sampling positions (pixels) (e.g. luminance, depth, etc.) of a tile.

The metadata may indicate a total value of a property of the sampling positions (pixels) in a tile, such as the total luminance, colour, etc.

The metadata may indicate an average value of a property of the sampling positions (pixels) in a tile. The processing operation will involve summing data values followed by dividing by the number of data values summed. This is equivalent to a box filter with size the same as the tile. The average colour of a tile may be used for ambient colour enhancement in a display device.

Modification flag: If any changes at all (or if sufficiently few changes) are made to the tile, a single flag is set. For example, writing the rendered fragment data to the tile buffer (e.g. when modifying an existing image) may or may not change existing data stored in the tile buffer, and the per-tile metadata may indicate whether or not any such change (or if only sufficiently minor changes) has been made. This metadata may be used, e.g., to suppress the output of the rendered fragment data to external memory 5 (e.g. when no changes have been made), to save bandwidth.

The metadata may be generated from rendered fragment data (e.g. depth values) which is not written out to main memory at all.

Domain transformations: the tile data may be transformed from a spatial grid into another domain, such as 2D spatial frequency using DCT, wavelet, or other similar techniques.

It is also possible to generate multiple different types of metadata from one pass over the data in the tile buffer, which may be written out separately or together. Any of the above operations may be combined, for example a frequency domain transformation can be combined with the histogram function to create a frequency histogram.

It can be seen from the above, the technology described herein, in its embodiments at least, provides mechanisms whereby processing operations can be performed upon rendered tile data within the graphics processing pipeline, thereby avoiding storage and subsequent re-storage of that data to and from external memory. This is achieved in the embodiments of the technology described herein at least by providing a programmable processing stage that is able to read data in the tile buffer, process that data and then write that data either to the tile buffer or out to external memory, without the need for the data in the tile buffer to be written to or read from external memory initially.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A tile-based graphics processing pipeline in which a render output is divided into plural rendering tiles for rendering purposes, comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
a tile buffer configured to store rendered fragment data for only part of the render output locally to the graphics processing pipeline prior to that data being written out to an external memory, the tile buffer storing data values for an array of sample positions of a rendering tile, with respective sets of the sample positions corresponding to and being associated with respective pixels of a rendering tile of an output data array that the rendered fragment data relates to;
write out stage circuitry configured to write data stored in the tile buffer to an external memory; and
programmable processing stage circuitry operable under the control of graphics program instructions to, for respective pixel positions of a rendering tile that rendered fragment data stored in the tile buffer represents, read rendered fragment data stored in the tile buffer for one or more sampling positions that are not associated with the pixel position in question, perform a processing operation using the rendered fragment data of the rendering tile read from the tile buffer to generate per-tile metadata that describes an aspect of the rendered fragment data of the rendering tile read from the tile buffer, and write the per-tile metadata that describes an aspect of the rendered fragment data of the rendering tile read from the tile buffer into the tile buffer or to an external memory.

2. The graphics processing pipeline of claim 1, wherein: the renderer and the programmable processing stage circuitry share programmable processing circuitry.

3. The graphics processing pipeline of claim 1, wherein the programmable processing stage circuitry reads a plurality of sample values from the tile buffer as inputs to its processing operation.

4. The graphics processing pipeline of claim 1, wherein the per-tile metadata are written back to the tile buffer and then written out to external memory by triggering fixed function write out from the tile buffer.

5. The graphics processing pipeline of claim 1, wherein the programmable processing stage circuitry can operate to prevent fixed function write out of a specific tile from the tile buffer.

6. The graphics processing pipeline of claim 1, wherein the operation of the programmable processing stage circuitry is triggered by including a command in the tile list of the tile or tiles for which the processing operation is to be performed.

7. The graphics processing pipeline of claim 6, wherein in response to the command, the graphics processing pipeline first waits until the rendering of fragments for the tile has been completed and the programmable processing stage circuitry then executes its processing operation on the values in the tile buffer.

8. The graphics processing pipeline of claim 1, wherein an API mechanism is used to trigger and control the operation of the programmable processing stage circuitry.

9. A tile based graphics processing pipeline in which a render output is divided into plural rendering tiles for rendering purposes, comprising:
a plurality of processing stages, including at least a rasteriser that rasterises input primitives to generate graphics fragments to be processed, and a renderer that processes fragments generated by the rasteriser to generate rendered fragment data;
a tile buffer configured to store rendered fragment data for only part of the render output of a rendering tile locally to the graphics processing pipeline prior to that data being written out to an external memory;
write out stage circuitry configured to write data stored in the tile buffer to an external memory; and
programmable processing stage circuitry operable under the control of graphics program instructions to read rendered fragment data from the tile buffer for a rendering tile stored in the tile buffer, and perform a processing operation using the rendered fragment data of the rendering tile read from the tile buffer to generate per-tile metadata that describes an aspect of the rendered fragment data of the rendering tile read from the tile buffer.

10. The tile-based graphics processing pipeline of claim 9, wherein the per-tile metadata comprises at least one of the following:
(i) the per-tile metadata comprises a histogram;
(ii) the per-tile metadata indicates at least one of: a minimum value, a maximum value, a total value, and an average value of the rendered fragment data of the rendering tile;
(iii) the per-tile metadata relates to at least one of: luminosity of the rendering tile, transparency of the rendering tile, depth values of the rendering tile, domain transformed information of the rendering tile, and colour values of the rendering tile.

11. A method of operating a tile-based graphics processing pipeline in which a render output is divided into plural rendering tiles for rendering purposes, that comprises:
    a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
    a tile buffer configured to store rendered fragment data for only part of the render output locally to the graphics processing pipeline prior to that data being written out to an external memory, the tile buffer storing data values for an array of sample positions of a rendering tile, with respective sets of the sample positions corresponding to and being associated with respective pixels of a rendering tile of an output data array that the rendered fragment data relates to;
    write out stage circuitry configured to write data stored in the tile buffer to an external memory; and
    programmable processing stage circuitry operable to, in response to one or more graphics program instructions, read rendered fragment data from the tile buffer for a rendering tile stored in the at least one tile buffer, perform a processing operation using the rendered fragment data of the rendering tile read from the tile buffer to generate per-tile metadata that describes an aspect of the rendered fragment data of the rendering tile read from the tile buffer, and write the per-tile metadata that describes an aspect of the rendered fragment data of the rendering tile read from the tile buffer into the tile buffer or to an external memory;
    the method comprising:
        issuing graphics program instructions to the programmable processing stage circuitry to cause the programmable processing stage circuitry to, for respective pixel positions of a rendering tile that rendered fragment data stored in the tile buffer represents, read rendered fragment data stored in the tile buffer for one or more sampling positions that are not associated with the pixel position in question, perform a processing operation using the rendered fragment data of the rendering tile read from the tile buffer to generate per-tile metadata that describes an aspect of the rendered fragment data of the rendering tile read from the tile buffer and write the per-tile metadata that describes an aspect of the rendered fragment data of the rendering tile read from the tile buffer into the tile buffer or to an external memory; and
        the programmable processing stage circuitry in response to the graphics program instructions, for respective pixel positions of a rendering tile that rendered fragment data stored in the tile buffer represents, reading rendered fragment data stored in the tile buffer for one or more sampling positions that are not associated with the pixel position in question, performing a processing operation using the rendered fragment data of the rendering tile read from the tile buffer to generate per-tile metadata that describes an aspect of the rendered fragment data of the rendering tile read from the tile buffer and writing the per-tile metadata that describes an aspect of the rendered fragment data of the rendering tile read from the tile buffer into the tile buffer or to an external memory.

12. The method of claim 11, further comprising the programmable processing stage circuitry reading a plurality of sample values from the tile buffer as inputs to its processing operation.

13. The method of claim 11, comprising writing the per-tile metadata back to the tile buffer and then writing them out to external memory by triggering fixed function write out from the tile buffer.

14. The method of claim 11, wherein the programmable processing stage circuitry can operate to prevent fixed function write out of a specific tile from the tile buffer.

15. The method of claim 11, further comprising triggering the operation of the programmable processing stage circuitry by including a command in the tile list of the tile or tiles for which the processing operation is to be performed.

16. The method of claim 15, wherein in response to the command, the graphics processing pipeline first waits until the rendering of fragments for the tile has been completed and the programmable processing stage circuitry then executes its processing operation on the values in the tile buffer.

17. The method of claim 11, comprising using API calls to trigger and control the operation of the programmable processing stage circuitry.

18. A method of generating metadata using a tile based graphics processing pipeline in which a render output is divided into plural rendering tiles for rendering purposes, and that comprises:
    a plurality of processing stages, including at least a rasteriser that rasterises input primitives to generate graphics fragments to be processed, and a renderer that processes fragments generated by the rasteriser to generate rendered fragment data;
    a tile buffer configured to store rendered fragment data for only part of the render output of a rendering tile locally to the graphics processing pipeline prior to that data being written out to an external memory;
    write out stage circuitry configured to write data stored in the tile buffer to an external memory; and
    programmable processing stage circuitry operable under the control of graphics program instructions to read rendered fragment data from the tile buffer for a rendering tile stored in the tile buffer, and perform a processing operation using the rendered fragment data of the rendering tile read from the tile buffer to generate per-tile metadata that describes an aspect of the rendered fragment data of the rendering tile read from the tile buffer;
    the method comprising:
        issuing graphics program instructions to the programmable processing stage circuitry to cause the programmable processing stage circuitry to read rendered fragment data from the tile buffer for a rendering tile stored in the tile buffer, and perform a processing operation using the rendered fragment data of the rendering tile read from the tile buffer to generate per-tile metadata that describes an aspect of the rendered fragment data of the rendering tile read from the tile buffer; and
        the programmable processing stage in response to the graphics program instructions, reading rendered fragment data from the tile buffer for a rendering tile stored in the tile buffer, and performing a processing operation using the rendered fragment data of the rendering tile read from the tile buffer to generate per-tile metadata that describes an aspect of the rendered fragment data of the rendering tile read from the tile buffer.

19. The method of claim 18, wherein the per-tile metadata comprises at least one of the following:
   (i) the per-tile metadata comprises a histogram;
   (ii) the per-tile metadata indicates at least one of: a minimum value, a maximum value, a total value, and an average value of the rendered fragment data of the rendering tile;
   (iii) the per-tile metadata relates to at least one of: luminosity of the rendering tile, transparency of the rendering tile, depth values of the rendering tile, domain transformed information of the rendering tile, and colour values of the rendering tile.

20. A computer readable storage medium storing computer software code which when executing on a processor performs a method of operating a tile-based graphics processing pipeline that comprises:
   a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
   a tile buffer configured to store rendered fragment data for only part of the render output locally to the graphics processing pipeline prior to that data being written out to an external memory, the tile buffer storing data values for an array of sample positions of a rendering tile, with respective sets of the sample positions corresponding to and being associated with respective pixels of a rendering tile of an output data array that the rendered fragment data relates to;
   write out stage circuitry configured to write data stored in the tile buffer to an external memory; and
   programmable processing stage circuitry operable to, in response to one or more graphics program instructions, read rendered fragment data from the tile buffer for a rendering tile stored in the at least one tile buffer, perform a processing operation using the rendered fragment data of the rendering tile read from the tile buffer to generate per-tile metadata that describes an aspect of the rendered fragment data of the rendering tile read from the tile buffer, and write the per-tile metadata that describes an aspect of the rendered fragment data of the rendering tile read from the tile buffer into the tile buffer or to an external memory;

the method comprising:
   issuing graphics program instructions to the programmable processing stage circuitry to cause the programmable processing stage circuitry to, for respective pixel positions of a rendering tile that rendered fragment data stored in the tile buffer represents, read rendered fragment data stored in the tile buffer for one or more sampling positions that are not associated with the pixel position in question, perform a processing operation using the rendered fragment data of the rendering tile read from the tile buffer to generate per-tile metadata that describes an aspect of the rendered fragment data of the rendering tile read from the tile buffer and write the per-tile metadata that describes an aspect of the rendered fragment data of the rendering tile read from the tile buffer into the tile buffer or to an external memory; and
   the programmable processing stage circuitry in response to the graphics program instructions, for respective pixel positions of a rendering tile that rendered fragment data stored in the tile buffer represents, reading rendered fragment data stored in the tile buffer for one or more sampling positions that are not associated with the pixel position in question, performing a processing operation using the rendered fragment data of the rendering tile read from the tile buffer to generate per-tile metadata that describes an aspect of the rendered fragment data of the rendering tile read from the tile buffer and writing the per-tile metadata that describes an aspect of the rendered fragment data of the rendering tile read from the tile buffer into the tile buffer or to an external memory.

* * * * *